United States Patent [19]
Malone et al.

[11] Patent Number: 6,088,214
[45] Date of Patent: Jul. 11, 2000

[54] VOLTAGE VARIABLE CAPACITOR ARRAY AND METHOD OF MANUFACTURE THEREOF

[75] Inventors: Hugh Robert Malone, Phoenix, Ariz.; James R. Phillips; Donald W. Forst, both of Albuquerque, N. Mex.; Deborah Sue Dendy, Tempe; Dean Lawrence Cook, Mesa, both of Ariz.

[73] Assignee: Motorola, Inc., Schaumburg, Ill.

[21] Appl. No.: 09/088,256

[22] Filed: Jun. 1, 1998

[51] Int. Cl.[7] .............................. H01G 5/01; H01G 5/06; H01G 4/228
[52] U.S. Cl. .......................... 361/278; 361/290; 361/292; 361/298.2; 361/301.4
[58] Field of Search ...................... 361/277, 311, 361/278, 313, 279, 301.4, 287, 290, 292, 296, 299.1, 299.2, 299.5, 298.3, 298.2, 306.1; 29/25.41, 25.42, 600; 333/184, 185

[56] References Cited

U.S. PATENT DOCUMENTS

| | | | |
|---|---|---|---|
| 3,166,723 | 1/1965 | Bock et al. | 333/10 |
| 4,127,834 | 11/1978 | Stringfellow et al. | 333/83 T |
| 4,238,662 | 12/1980 | Lao | 219/121 |
| 4,292,659 | 9/1981 | Lao | 361/283 |
| 4,380,747 | 4/1983 | Curtinot et al. | 333/202 |
| 4,490,772 | 12/1984 | Blickstein | 361/281 |
| 5,543,765 | 8/1996 | Cachier | 333/246 |
| 5,771,567 | 6/1998 | Pierce et al. | 29/600 |
| 5,780,885 | 7/1998 | Diem et al. | 257/254 |

*Primary Examiner*—Dean A. Reichard
*Assistant Examiner*—Anthony Dinkins
*Attorney, Agent, or Firm*—James E. Klekotka; Walter W. Nielsen; Sharon K. Coleman

[57] ABSTRACT

An array (100) of voltage variable capacitors (110) is provided in which voltage variable capacitors (110) are fabricated with piezoelectric displacement devices (150). Voltage variable capacitors (110) have first plates (120) which are coupled to displacement devices (150). First plates (120) are dielectrically coupled to second plates (130). Displacement device (150) has a stack of metallic layers (154), voltage variable material blocks (152), and voltage supply terminals (170) and (180). Voltage differences are established across voltage variable material blocks (152) using voltage supply terminals (170) and (180). A voltage difference causes a voltage variable material layer to change thickness, and this causes first plate (120) to move relative to second plate (130). Voltage variable material is selected from a group of piezoelectric ceramics, which can include lead-titanate ($PbTiO_3$), lead-zirconate ($PbZrO_3$), barium-titanate ($BaTiO_3$), and lead-zirconate-titanate ($PbZr_xTi_{1-x}O_3$), where x varies from zero to one.

25 Claims, 3 Drawing Sheets

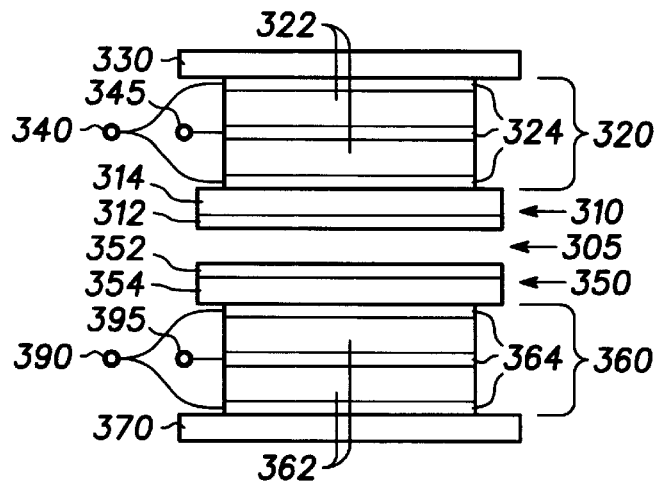
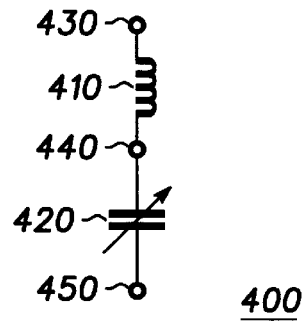
FIG. 3
FIG. 4
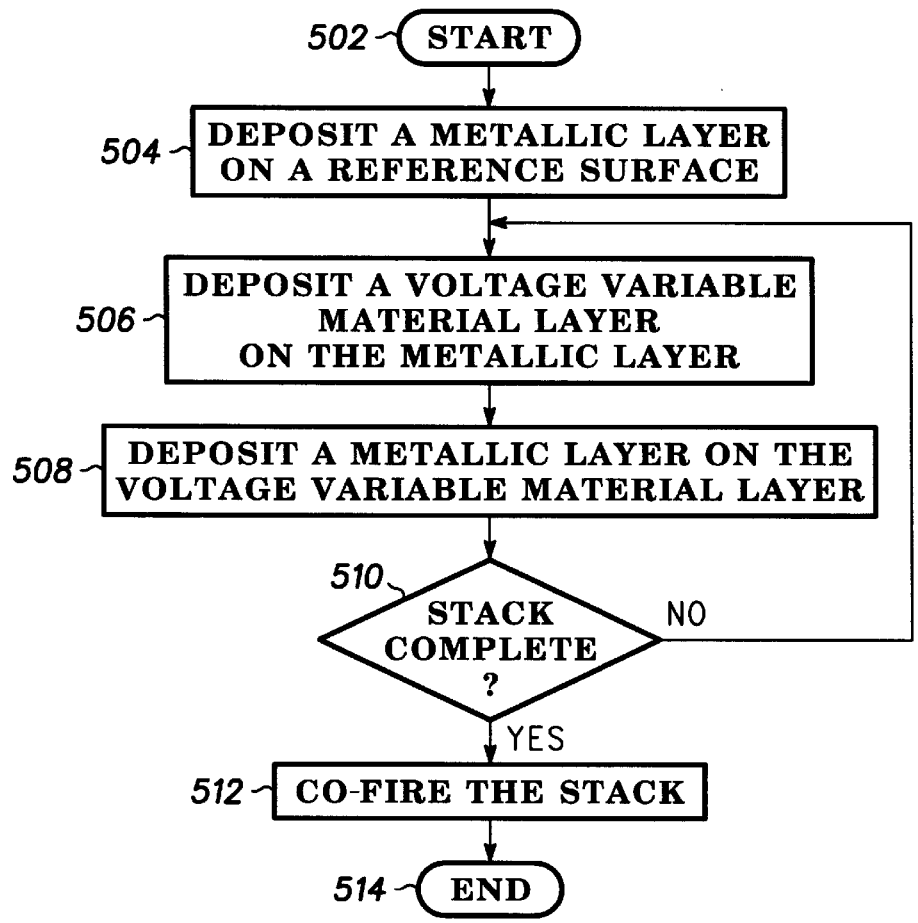
FIG. 5

6,088,214

VOLTAGE VARIABLE CAPACITOR ARRAY AND METHOD OF MANUFACTURE THEREOF

CROSS-REFERENCE TO RELATED INVENTIONS

The present invention is related to the following inventions filed concurrently herewith and assigned to the same assignee as the present invention:

(1) U.S. patent Ser. No. 09/088,197 entitled "Phased Array Antenna Using Piezoelectric Actuators In Variable Capacitors To Control Phase Shifters And Method Of Manufacture Thereof"; and (2) U.S. patent Ser. No. 09/088,255, entitled "Phased Array Antenna Using Piezoelectric Actuators To Control Waveguide Phase Shifters And Method Of Manufacture Thereof".

FIELD OF THE INVENTION

The present invention relates generally to capacitor arrays and, more particularly, to an array of voltage variable capacitors and a method of manufacture thereof.

BACKGROUND OF THE INVENTION

The piezoelectric effect is a property that exists in many materials. In a piezoelectric material, the application of a force or stress results in the development of an electric charge in the material. This is known as the direct piezoelectric effect. Conversely, the application of an electric field to the same material will result in a change in mechanical dimensions or strain. This is known as the indirect piezoelectric effect.

Arrays of voltage variable capacitors are required in an increasing number of microwave circuits such as filters and phase shifters.

Thus, what is needed is an apparatus having an array of voltage variable capacitors for use in electronic circuits such as microwave components as well as a method of manufacture thereof.

BRIEF DESCRIPTION OF THE DRAWINGS

A more complete understanding of the invention can be derived by referring to the detailed description and claims when considered in connection with the figures, wherein like reference numbers refer to similar items throughout the figures, and:

FIG. 3 illustrates a voltage variable capacitor in accordance with a second alternate embodiment of the invention;

FIG. 4 illustrates a simplified schematic diagram of an electronic circuit using at least one voltage variable capacitor in accordance with a preferred embodiment of the invention;

FIG. 5 illustrates a flowchart of a method for manufacturing a displacement device that is performed in accordance with a preferred embodiment of the invention.

DETAILED DESCRIPTION OF A PREFERRED EMBODIMENT

The invention provides an apparatus for providing an array of voltage variable capacitors for use in microwave components. The invention also provides a fabrication process that is simple, accurate, low-cost, and repeatable.

The invention also provides an apparatus for non-evasively controlling an array of voltage variable capacitors. The invention uses piezoelectric materials to implement the voltage variability. In particular, the invention uses piezoelectric ceramics to implement a voltage variable displacement device for moving at least one plate of a capacitor relative to another plate. The displacement device allows the capacitance value to be changed without affecting the capacitor's performance at microwave frequencies. That is, the displacement device is positioned so that it is independent from the microwave circuitry.

Figure 1:
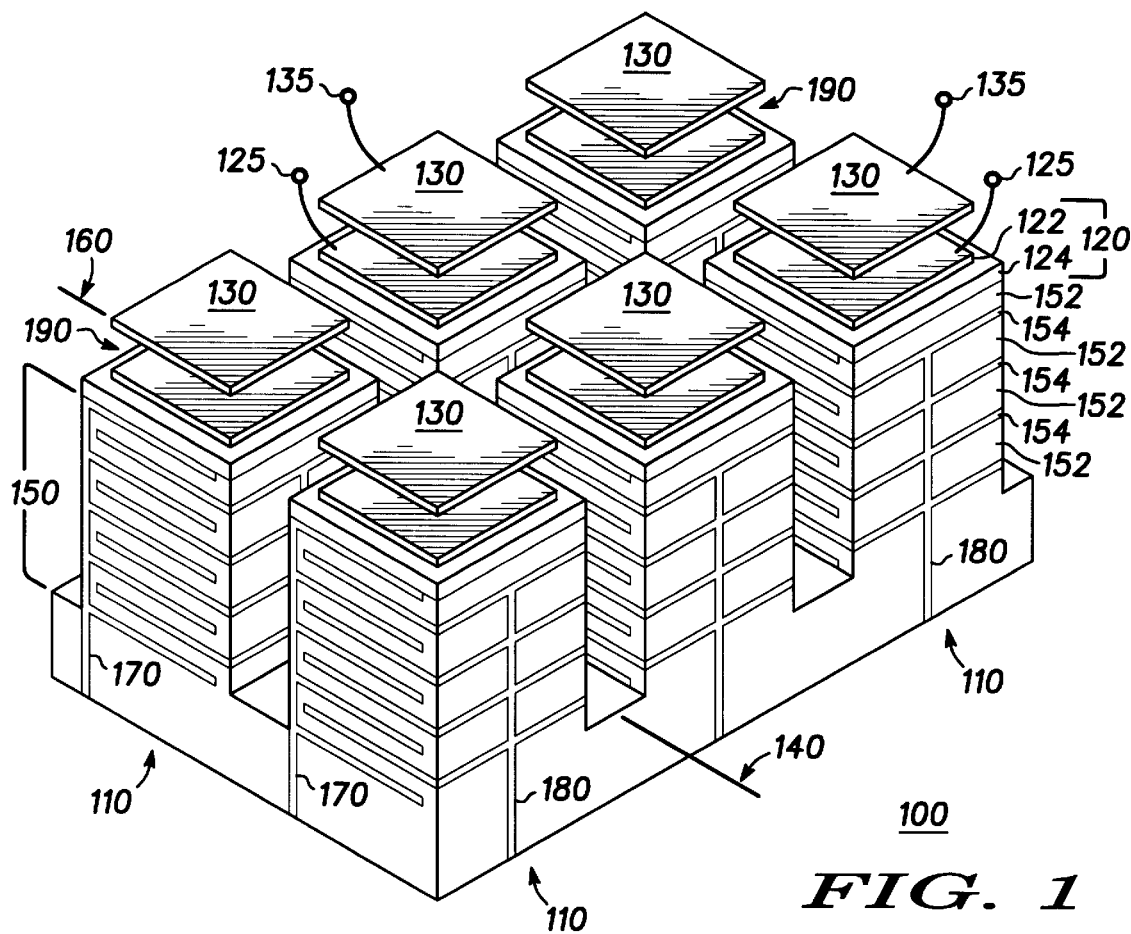
FIG. 1 shows a simplified view of an array of voltage variable capacitors in accordance with a preferred embodiment of the invention.

FIG. 1 shows an array of voltage variable capacitors in accordance with a preferred embodiment of the invention. Voltage variable capacitor array 100 comprises a number of voltage variable capacitors 110.

In a preferred embodiment, voltage variable capacitor 110 comprises first plate 120, second plate 130, and displacement device 150. In FIG. 1, reference surfaces 140 and 160 are also illustrated. Reference surfaces are illustrated in FIG. 1 to provide reference points, which are used to explain how voltage variable capacitors 110 function and how they are fabricated. Those skilled in the art will recognize that reference surfaces 140 and 160 may not be required in alternate embodiments.

In a preferred embodiment, displacement device 150 is coupled to first reference surface 140. Those skilled in the art will recognize that alternate embodiments can be envisioned in which displacement device 150 is not coupled to first reference surface 140. For example, multiple displacement devices could be coupled to each other to form a larger device.

In a preferred embodiment, first plate 120 comprises metallic layer 122 on separation layer 124. In this embodiment, separation layer comprises a non-conducting material, which is used to electrically isolate metallic layer 122. Those skilled in the art will recognize that alternate embodiments can be envisioned in which first plate 120 does not comprise separation layer 124. In alternate embodiments, first plate 120 could be included in displacement device 150. In other alternate embodiments, first plate 120 could comprise a metallic sheet or plate.

In a preferred embodiment, first plate 120 is coupled to displacement device 150. In this embodiment, separation layer 124 and metallic layer 122 are deposited on one end of displacement device 150. Those skilled in the art will recognize that alternate embodiments can be envisioned in which different fabrication methods are used to form first plate 120 and couple it to displacement device 150.

In a preferred embodiment, second plate 130 is coupled to second reference surface 160. Second plate 130 comprises a metallic layer, which is deposited on second reference surface 160. Those skilled in the art will recognize that alternate embodiments can be envisioned in which different fabrication methods are used to form second plate 130. Those skilled in the art will also recognize that second plate 130 does not have to be coupled to second reference surface 160. For example, second plate 130 can be coupled to a different fixed surface.

Those skilled in the art will also recognize that second plate 130 does not have to comprise a metallic layer. In alternate embodiments, second plate 130 could comprise a metallic sheet or plate.

In a preferred embodiment, second plate 130 is dielectrically coupled to first plate 120, using at least one compliant dielectric material in gap 190. Those skilled in the art will recognize that a number of different coupling mechanisms could be used, such as air or another suitable gas. For example, one or more pieces of dielectric material could be used, and they could be positioned within gap 190.

In a preferred embodiment, gap 190 represents a distance between first plate 120 and second plate 130. In this embodiment, second plate 130 is stationary, and its position is defined with respect to second reference surface 160. In addition, the distance between first reference surface 140 and second reference surface 160 is fixed. This means that second plate 130 remains at a substantially fixed distance from first reference surface 140, and first plate 120 changes its position relative to first reference surface 140 and second plate 130. In this way, gap 190, which represents the displacement between first plate 120 and second plate 130, changes, and a parallel plate capacitor with voltage variable gap spacing (displacement) is established.

In an alternate embodiment, an isolation layer can be provided between first plate 120 and second plate 130. In this embodiment, the isolation layer prevents first plate 120 from coming in contact with second plate 130. For example, allowing first plate 120 and second plate 130 to contact each other causes an electrical short, and this is not desirable in many applications.

In a preferred embodiment, displacement device 150 comprises a number of blocks 152 of voltage variable material and a number of metallic layers 154. In this embodiment, voltage variable material blocks 152 are positioned between metallic layers 154, forming a stacked configuration. Desirably, a stacked configuration is used for displacement device 150 to allow lower voltages to be used to achieve the same overall total displacement. Voltage variable material is material in which at least one mechanical dimension changes due to the application of a voltage difference.

In a preferred embodiment, voltage variable material blocks 152 are substantially the same size. In this embodiment, voltage variable material blocks 152 have substantially the same width, substantially the same length, and substantially the same thickness. Those skilled in the art will recognize that voltage variable material blocks 152 having different dimensions can be used in alternate embodiments.

In a preferred embodiment, metallic layers 154 are substantially the same size. In this embodiment, metallic layers 154 have substantially the same width, substantially the same length, and substantially the same thickness. Those skilled in the art will recognize that metallic layers 154 having different dimensions can be used in alternate embodiments.

In a preferred embodiment, alternate metallic layers are electrically coupled. Metallic layers 154 can be at odd or even counting positions in a stack. In this embodiment, the counting positions are established relative to the top of the stack, although this is not required for the invention. Metallic layers 154 having odd-numbered positions within the stack are coupled to first terminal 170, and metallic layers 154 having even-numbered positions within the stack are coupled to second terminal 180. In this manner, each voltage variable material block 152 has an odd-numbered metallic layer on one end and an even-numbered metallic layer on the opposite end.

Desirably, a voltage source is coupled between first terminal 170 and second terminal 180. The voltage source establishes a voltage difference between odd-numbered metallic layers and even-numbered metallic layers. In this way, a voltage difference is established across each voltage variable material block 152. This voltage difference causes a change in the thickness of voltage variable material block 152. In this embodiment, the thickness is the dimension between metallic layers 154. Those skilled in the art will recognize that the voltage difference can also alter other dimensions in voltage variable material block 152.

In a preferred embodiment, the voltage variable material is a piezoelectric material. Desirably, the piezoelectric material is selected from a group consisting of lead-titanate ($PbTiO_3$), lead-zirconate ($PbZrO_3$), barium-titanate ($BaTiO_3$), and lead-zirconate-titanate ($PbZr_xTi_{1-x}O_3$), where x varies from zero to one. The subscripts (x and 1-x) are used to represent the molar amounts of lead-zirconate and lead-titanate, respectively.

In alternate embodiments, the piezoelectric material could be an electrically active polymer material. In these embodiments, the dimensional change versus voltage of an electrically active polymer material can be 100 to 1000 times greater than the change for a conventional piezoelectric material.

Ceramic materials are often not piezoelectric until their random ferroelectric domains are aligned. This alignment is accomplished through a process known as "poling". Poling includes inducing a direct current (DC) voltage across the material. The ferroelectric domains align to the induced field, resulting in a net piezoelectric effect. It should be noted that not all the domains become exactly aligned. Some of the domains only partially align, and some do not align at all. The number of domains that align depends upon the poling voltage, temperature, crystal structure, and the length of time the voltage is held on the material.

During poling, the material permanently increases in the dimension between the poling electrodes and decreases in dimensions parallel to the electrodes. The material can be de-poled by reversing the poling voltage, increasing the temperature beyond the material's Curie point, or by inducing a large mechanical stress in the opposite direction of polarity.

Voltage applied to the electrodes (as illustrated by metallic layers 154) at the same polarity as the original poling voltage results in a further increase in the dimension between the electrodes and decreases the dimensions parallel to the electrodes. Applying a voltage to the electrodes in an opposite direction decreases the dimension between the electrodes and increases the dimensions parallel to the electrodes.

In a preferred embodiment, first connection terminal 125 is coupled to first plate 120, and second connection terminal 135 is coupled to second plate 130. In this embodiment, first connection terminal 125 and second connection terminal 135 are used to couple voltage variable capacitor 110 into an electrical (microwave) circuit.

In FIG. 1, first plate 120 and second plate 130 are illustrated using a substantially square shape. The substantially square shape is for illustrative purposes. Those skilled in the art will recognize that any appropriate geometric shape could be used for first plate 120 and second plate 130. For example, rectangular, circular, or elliptical shapes could be used.

In FIG. 1, first plate 120 and second plate 130 are illustrated as comprising a single shape. This is for illustrative purposes, and it is not required for the invention. In alternate embodiments, any number of different sizes and shapes could be used for first plate 120 and second plate 130.

In FIG. 1, displacement device 150 is illustrated using a rectangular shape. This is for illustrative purposes, and it is not required for the invention. In alternate embodiments, any number of different sizes and shapes could be used for displacement device 150.

In FIG. 1, reference numerals are not shown for all elements to simplify the illustration of the invention, and this is not intended to limit the scope of the invention.

In alternate embodiments, second plate 130 could comprise two separate metallic layers, which form a second plate and a third plate. In these embodiments, two separate capacitors are established. A first capacitor is formed using the first plate and the second plate. A second capacitor is formed using the first plate and the third plate. In these embodiments, the first plate moves with respect to the second plate and third plate, and the second capacitor can be used as a sensing element in a control circuit for the first capacitor. For example, changes in the displacement between the first plate and third plate can be monitored and used in a feedback arrangement to control the displacement between the first plate and the second plate. Other embodiments use the two capacitors in a series arrangement to facilitate using the capacitors in a microwave circuit.

Those skilled in the art will recognize that other embodiments are also possible. For example, the first plate could move with respect to second plate and/or third plate. Those skilled in the art will also recognize that the spatial separation between a first plate and a second plate can be different from the spatial separation between a first plate and a third plate. For example, a different spatial separation (gap) allows capacitance values to be different. It should also be apparent that all of the plates can have different shapes.

Figure 2:
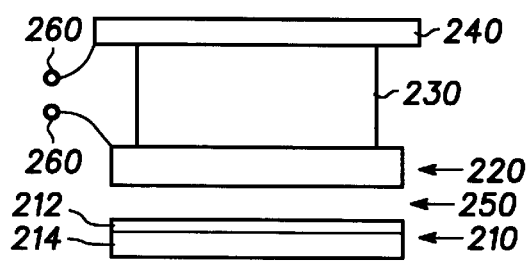
FIG. 2 illustrates a voltage variable capacitor in accordance with a first alternate embodiment of the invention.

Additional examples of alternate embodiments for voltage variable capacitors are illustrated in FIG. 2 and FIG. 3.

FIG. 2 illustrates a voltage variable capacitor in accordance with a first alternate embodiment of the invention. In this embodiment, a single layer of voltage variable material is used. Voltage variable capacitor 200 comprises first plate 210, second plate 220, voltage variable material block 230, and reference surface 240.

In FIG. 2, first plate 210 comprises metallic layer 212 on substrate 214. Those skilled in the art will recognize that other alternate embodiments can be envisioned in which first plate 210 does not comprise a metallic layer. In additional embodiments, first plate 210 could comprise a metallic sheet.

In FIG. 2, second plate 220 comprises a metallic layer which is deposited on one end of voltage variable material block 230. Alternate embodiments can also be envisioned in which second plate 220 comprises at least one non-metallic layer. In additional embodiments, second plate 220 could comprise a metallic sheet that is attached to one end of voltage variable material block 230.

In FIG. 2, a single rectangular block 230 of voltage variable material is used. In other alternate embodiments, the voltage variable material does not have to be configured as a rectangular block. In some embodiments, a cylindrical shape or other suitable shape could be used.

In this embodiment, reference surface 240 is a metallic surface that is used as a reference point relative to first plate 210 and relative to second plate 220. First plate 210 is at a fixed distance from reference surface 240. Second plate 220 is allowed to move relative to reference surface 240 and first plate 210.

Voltage supply network 260 is used to provide a voltage difference across voltage variable material block 230. The voltage difference causes at least one dimension to change in voltage variable material block 230. In this embodiment, the distance between reference surface 240 and second plate 220 changes in response to changes in the voltage difference established across voltage variable material block 230.

In FIG. 2, gap spacing 250 is established based on the distance between first plate 210 and second plate 220. In this embodiment, first plate 210 remains at a substantially fixed distance from reference surface 240, and second plate 220 changes its position relative to reference surface 240 and first plate 210. In this way, a voltage variable capacitor with a voltage variable gap spacing (displacement) is established.

FIG. 3 illustrates a voltage variable capacitor in accordance with a second alternate embodiment of the invention. In this embodiment, both capacitor plates can be moved in a controllable manner. Voltage variable capacitor 300 comprises first plate 310, first displacement device 320, first reference surface 330, second plate 350, second displacement device 360, and second reference surface 370.

In FIG. 3, first plate 310 comprises metallic layer 312 and isolation layer 314. In this embodiment, isolation layer 314 and metallic layer 312 are deposited on one end of first displacement device 320. Other alternate embodiments can be envisioned in which first plate 310 does not comprise a metallic layer. For example, first plate 310 could comprise a metallic sheet.

In FIG. 3, first displacement device 320 comprises a number of metallic layers 324 and a number of blocks 322 of piezoelectric material positioned between metallic layers 324, forming a stacked configuration. A stacked configuration is used to allow lower voltages to be used to achieve the same overall total displacement.

In this embodiment, piezoelectric material blocks 322 have substantially the same width, substantially the same length, and substantially the same thickness. In addition, metallic layers 324 have substantially the same width, substantially the same length, and substantially the same thickness.

In this embodiment, alternate metallic layers in first displacement device 320 are electrically coupled. Metallic layers 324 can be at odd or even numbered positions in a stack. In this embodiment, metallic layers having odd-numbered positions are coupled to a first terminal 340, and metallic layers having even-numbered positions are coupled to a second terminal 345. In this manner, each block 322 of piezoelectric material has an odd-numbered metallic layer on one end and an even-numbered metallic layer on the opposite end. A first voltage difference is established across each piezoelectric material block 322. This first voltage difference causes a change in the thickness of piezoelectric material block 322. In this embodiment, the thickness is the dimension between the metallic layers.

In FIG. 3, second plate 350 comprises metallic layer 352 and isolation layer 354. In this embodiment, isolation layer 354 and metallic layer 352 can be deposited on one end of second displacement device 360. Other alternate embodiments can be envisioned in which second plate 350 does not comprise a metallic layer. For example, second plate 350 could comprise a metallic sheet.

In FIG. 3, second displacement device 360 comprises a number of metallic layers 364 and a number of blocks 362 of piezoelectric material positioned between metallic layers 364, forming a stacked configuration. A stacked configuration is used to allow lower voltages to be used to achieve the same overall total displacement.

In this embodiment, piezoelectric material blocks 362 have substantially the same width, substantially the same length, and substantially the same thickness. In addition, metallic layers 364 have substantially the same width, substantially the same length, and substantially the same thickness.

In this embodiment, alternate metallic layers in second displacement device 360 are electrically coupled. Metallic layers 364 can be at odd or even numbered positions in a stack. In this embodiment, metallic layers having odd-numbered positions are coupled to a first terminal 390, and metallic layers having even-numbered positions are coupled to a second terminal 395. In this manner, each block 362 of piezoelectric material has an odd-numbered metallic layer on one end and an even-numbered metallic layer on the opposite end. A second voltage difference is established across each piezoelectric material block 362. This second voltage difference causes a change in the thickness of piezoelectric material block 362. In this embodiment, the thickness is the dimension between the metallic layers.

In FIG. 3, first displacement device 320 and second displacement device 360 can be used separately or together to change spacing 305 which is the displacement between first plate 310 and second plate 350. The first and second voltage differences can be used either separately or together to cause the spacing to change. In this way, a voltage variable capacitor with voltage variable gap spacing is established where the spacing (displacement) is controlled using one or two independent displacement devices.

FIG. 4 illustrates a simplified schematic diagram of an electronic circuit using at least one voltage variable capacitor in accordance with a preferred embodiment of the invention. Electronic circuit 400 comprises inductive element 410, capacitive element 420, first terminal 430, second terminal 440, and third terminal 450. In this embodiment, capacitive element is a voltage variable capacitor such as voltage variable capacitor 110 (FIG. 1). Electronic circuit 400 can be used in a phase shifter, filter, oscillator or other network requiring reactive elements as shown in FIG. 4.

Alternate embodiments can be envisioned in which a different number of inductive elements 410 and a different number of capacitive elements 420 are used. Alternate embodiments can also be envisioned in which a number of inductive elements 410 and a number of capacitive elements 420 are coupled in different manners. For example, inductive element 410 and capacitive element 420 can be coupled in parallel FIG. 5 illustrates a flowchart of a method for manufacturing a displacement device that is performed in accordance with a preferred embodiment of the invention. Procedure 500 starts with step 502.

In step 504, a metallic layer is deposited on a reference surface using at least one metal. In step 506, a layer of voltage variable material is deposited on the metallic layer, covering at least a part of the metallic layer. Desirably, the voltage variable material is selected from a group consisting of lead-titanate ($PbTiO_3$), lead-zirconate ($PbZrO_3$), barium-titanate ($BaTiO_3$), and lead-zirconate-titanate ($PbZr_xTi_{1-x}O_3$), where x varies from zero to one. The subscripts (x and 1-x) are used to represent the molar amounts of lead-zirconate and lead-titanate, respectively.

In step 508, another metallic layer is deposited on the voltage variable material layer using at least one metal.

In step 510, a query is performed to determine if a stack is complete. When the stack is not complete, then procedure 500 branches to step 506 and iterates as shown in FIG. 5. When the stack is complete, then procedure 500 branches to step 512 and continues as shown in FIG. 5.

Desirably, steps 506–510 are repeated N times, thereby creating a stack having N voltage variable material layers and N+1 metallic layers.

In step 512, the stack is co-fired. In a preferred embodiment, displacement device 150 (FIG. 1) is fabricated using a multilayer ceramic technology known as tape casting. Using multilayer ceramic technology, metallic layers can be placed between layers of ceramic material, and the entire package can be co-fired in a single operation. For example, displacement device 150 can be formed using a stack of multiple unfired ceramic material layers interspersed with layers comprising at least one conductive metal. In this embodiment, a bonding agent is used as a holding mechanism for the unfired ceramic material.

In a preferred embodiment, metallic layers having odd-numbered positions within the stack are coupled to each other, and metallic layers having even-numbered positions within the stack are coupled to each other.

Procedure 500 ends in step 514. For example, procedure 500 can be performed a number of times to produce a K by L array of displacement devices on one or more substrates, where K and L are positive integers. In alternate embodiments, an array of displacement devices can be manufactured from a single die fabricated using steps as shown in FIG. 5. In other embodiments, an array of displacement devices can be manufactured in which at least one of the voltage variable material layers comprises electrically active polymer material.

Figure 6:
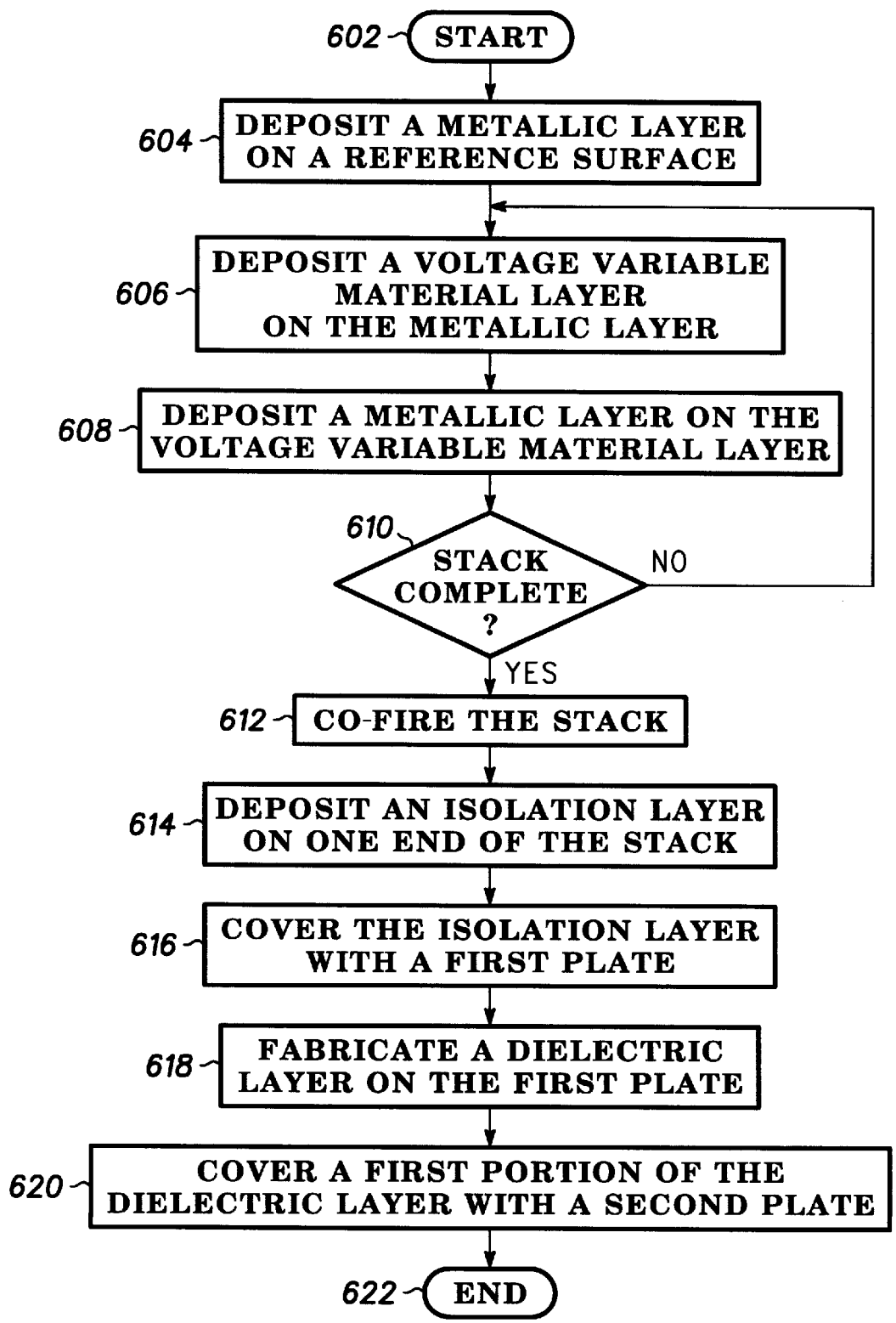
FIG. 6 illustrates a flowchart of a method for manufacturing a voltage variable capacitor that is performed in accordance with a preferred embodiment of the invention.

FIG. 6 illustrates a flowchart of a method for manufacturing a voltage variable capacitor that is performed in accordance with a preferred embodiment of the invention. Procedure 600 starts with step 602.

In step 604, a metallic layer is deposited on a reference surface using at least one metal. In step 606, a layer of voltage variable material is deposited on the metallic layer. Desirably, the voltage variable material is selected from a group consisting of lead-titanate ($PbTiO_3$), lead-zirconate ($PbZrO_3$), barium-titanate ($BaTiO_3$), and lead-zirconate-titanate ($PbZr_xTi_{1-x}O_3$), where x varies from zero to one. The subscripts (x and 1-x) are used to represent the molar amounts of lead-zirconate and lead-titanate, respectively. In step 608, another metallic layer is deposited on the voltage variable material layer using at least one metal.

In step 610, a query is performed to determine if a stack is complete. When the stack is not complete, then procedure 600 branches to step 606 and iterates as shown in FIG. 6. When the stack is complete, then procedure 600 branches to step 612 and continues as shown in FIG. 6.

Desirably, steps 606–610 are repeated N times, thereby creating a stack having N voltage variable material layers and N+1 metallic layers.

In step 612, the stack is co-fired. In a preferred embodiment, the displacement device portion of voltage variable capacitor 110 (FIG. 1) is fabricated using a multi-layer ceramic technology known as tape casting. Using multilayer ceramic technology, layers of unfired ceramic material can be placed between metallic layers, and an entire stack can be co-fired in a single operation.

In a preferred embodiment, metallic layers having odd-numbered positions within the stack are coupled to each other, and metallic layers having even-numbered positions within the stack are coupled to each other.

In step 614, an isolation layer, such as illustrated by isolation layer 124 (FIG. 1), is deposited on one end of the stack. In alternate embodiments, step 614 can be performed before the stack is co-fired.

In step 616, the isolation layer is covered with a metallic layer, such as illustrated by metallic layer 122 (FIG. 1), to form a first plate in a voltage variable capacitor, such as illustrated by first plate 120 (FIG. 1). In a preferred embodiment, a connection terminal, such as illustrated by connection terminal 125 (FIG. 1), is attached to the first plate.

In step 618, a dielectric layer is deposited on the first plate in the voltage variable capacitor. In this manner, a gap, such as illustrated by gap 190 (FIG. 1), is formed for the voltage variable capacitor. The dielectric layer comprises at least one compliant dielectric material. In alternate embodiments, a number of different coupling mechanisms could be used.

In step 620, a first portion of the dielectric layer is covered using a second plate in the voltage variable capacitor, such as illustrated by second plate 130 (FIG. 1). In a preferred embodiment, the second plate is coupled to a reference surface, such as illustrated by second reference surface 160 (FIG. 1). The second plate comprises a metallic layer, which is deposited on the reference surface. The second plate is positioned so that it covers a first portion of the dielectric layer, forming the voltage variable capacitor. In a preferred embodiment, a connection terminal, such as illustrated by connection terminal 135 (FIG. 1), is attached to the second plate. Procedure 600 ends in step 622.

In this embodiment, the second plate in the voltage variable capacitor is stationary. The second plate has its position defined with respect to at least one reference surface. The distance between reference surfaces is fixed. This means that the first plate in the voltage variable capacitor changes its position relative to the second plate. The change in position is caused by dimensional changes in a displacement device, such as illustrated by displacement device 150 (FIG. 1). In this way, the amount of displacement between the first plate and the second plate changes, and a voltage variable capacitor with a voltage variable gap spacing (displacement) is established.

The invention provides a simple, accurate, low-cost, and repeatable method for producing an array of voltage variable capacitors. For example, procedure 600 can be performed a number of times to produce a K by L array on one or more substrates, where K and L are positive integers. In the invention, voltage variable materials are used to cause the displacement between two plates of a capacitor to change, thereby changing the capacitance value of the capacitor. In alternate embodiments, an array of voltage variable capacitors can be manufactured in which at least one of the voltage variable material layers comprises electrically active polymer material.

The invention has been described above with reference to a preferred embodiment. However, those skilled in the art will recognize that changes and modifications can be made in this preferred embodiment without departing from the scope of the invention. For example, the materials identified herein can be changed while achieving equivalent results.

What is claimed is:

1. An apparatus comprising:
   a plurality of first plates;
   a plurality of second plates dielectrically coupled to said plurality of first plates, wherein a first amount of displacement is established between a first plate and a second plate, said first amount of displacement establishing a first amount of capacitance between said first plate and said second plate; and
   a plurality of displacement devices coupled to said plurality of first plates, wherein a displacement device comprises a layer of voltage variable material having a voltage variable thickness which changes when a voltage difference is applied across said layer of voltage variable material, thereby causing said first amount of displacement to change.

2. The apparatus as recited in claim 1, wherein said displacement device further comprises:
   a plurality of voltage variable material layers, wherein a voltage variable material layer has a voltage variable thickness which is controlled by a voltage difference applied across said voltage variable material layer; and
   a plurality of metallic layers, wherein said plurality of metallic layers is alternated with said plurality of voltage variable material layers to form a stack such that each one of said plurality of voltage variable material layers is disposed between two corresponding ones of said plurality of metallic layers.

3. The apparatus as recited in claim 2, wherein at least one of said plurality of voltage variable material layers comprises a piezoelectric material.

4. The apparatus as recited in claim 2, wherein at least one of said plurality of voltage variable material layers comprises electrically active polymer material.

5. The apparatus as recited in claim 2, wherein at least one of said plurality of voltage variable material layers comprises material selected from a group consisting of lead-titanate ($PbTiO_3$), lead-zirconate ($PbZrO_3$), barium-titanate ($BaTiO_3$), and lead-zirconate-titanate ($PbZr_xTi_{1-x}O_3$), where x varies from zero to one.

6. The apparatus as recited in claim 2, wherein a displacement device further comprises:
   a voltage supply network coupled to at least two of said plurality of metallic layers, said voltage supply network providing said voltage difference.

7. The apparatus as recited in claim 2, wherein said displacement device further comprises:
   a first set of metallic layers, wherein said plurality of metallic layers that is alternated with said plurality of voltage variable material layers to form said stack is further identified by either odd-numbered positions or even-numbered positions within said stack, said first set of metallic layers occupying said odd-numbered positions; and
   a second set of metallic layers occupying said even-numbered positions.

8. The apparatus as recited in claim 7, wherein said displacement device further comprises:
   a first terminal coupled to said first set of metallic layers; and
   a second terminal coupled to said second set of metallic layers.

9. The apparatus as recited in claim 8, wherein said displacement device further comprises:
   a first group of voltage variable material layers having a first polarity, wherein each one of said first group has a first surface and a second surface, said first surface being coupled to one of said first set of metallic layers in said stack, said second surface being coupled to one of said second set of metallic layers in said stack; and
   a second group of voltage variable material layers having a second polarity, wherein each one of said second group has a first surface and a second surface, said first surface being coupled to one of said second set of metallic layers in said stack, said second surface being coupled to one of said first set of metallic layers in said stack.

10. The apparatus as recited in claim 9, wherein said first polarity is established using a first poling voltage applied in a first direction across a voltage variable material layer in said first group, and said second polarity is established using a second poling voltage applied in a second direction across a voltage variable material layer in said second group.

11. The apparatus as recited in claim 9, wherein said first polarity is established using a first poling voltage applied in a first direction across a voltage variable material layer in said first group, and said second polarity is established using said first poling voltage applied in a second direction across a voltage variable material layer in said second group.

12. The apparatus as recited in claim 7, wherein a first polarity is established using a positive voltage difference applied from one of said first set of metallic layers to one of said second set of metallic layers, and a second polarity is established using a positive voltage difference applied from one of said first set of metallic layers to one of said second set of metallic layers.

13. The apparatus as recited in claim 1, wherein said apparatus further comprises:

a plurality of third plates dielectrically coupled to said plurality of first plates, wherein a second amount of displacement is established between said plurality of first plates and said plurality of third plates, said plurality of displacement devices controlling said second amount of displacement, thereby forming a second set of voltage variable capacitors.

14. The apparatus as claimed in claim 13, wherein said second amount of displacement is used to control said first amount of displacement.

15. The apparatus as recited in claim 1, wherein at least one of said plurality of second plates is dielectrically coupled to one of said plurality of first plates using a gas.

16. The apparatus as recited in claim 1, wherein at least one of said plurality of second plates is dielectrically coupled to one of said plurality of first plates using a compliant dielectric material which allows said at least one of said plurality of second plates to move relative to one of said plurality of first plates.

17. The apparatus as recited in claim 1, wherein said apparatus further comprises:

at least one isolation layer which is located between at least one of said plurality of second plates and one of said plurality of first plates and prevents said at least one of said plurality of second plates from contacting said one of said plurality of first plates.

18. The apparatus as recited in claim 1, wherein said plurality of displacement devices are fabricated on a single substrate as an array having K rows and L columns, wherein K and L are positive integers.

19. A voltage variable capacitor comprising:

a first plate;

a second plate dielectrically coupled to said first plate, wherein a first amount of displacement is established between said first plate and said second plate, said first amount of displacement establishing a first amount of capacitance between said first plate and said second plate; and a displacement device coupled to said first plate, said displacement device changing said first amount of displacement, wherein said displacement device comprises a plurality of voltage variable material layers and a plurality of metallic layers, wherein said plurality of metallic layers is alternated with said plurality of voltage variable material layers to form a stack such that a voltage variable material layer is disposed between two corresponding ones of said plurality of metallic layers, said voltage variable material layer having a voltage variable thickness which changes when a voltage difference is applied across said voltage variable material layer, thereby changing a distance between said two corresponding ones of said plurality of metallic layers which causes said first amount of capacitance to change.

20. The voltage variable capacitor as recited in claim 19, wherein said plurality of voltage variable material layers comprises at least one material selected from a group consisting of lead-titanate ($PbTiO_3$), lead-zirconate ($PbZrO_3$), barium-titanate ($BaTiO_3$), and lead-zirconate-titanate ($PbZr_xTi_{1-x}O_3$), where x varies from zero to one.

21. The voltage variable capacitor as recited in claim 19, wherein at least one of said plurality of voltage variable material layers comprises electrically active polymer material.

22. The voltage variable capacitor as recited in claim 19, wherein in said displacement device said plurality of metallic layers that is alternated with said plurality of voltage variable material layers to form said stack is further identified by either odd-numbered positions or even-numbered positions within said stack and wherein said displacement device further comprises:

a first set of metallic layers occupying said odd-numbered positions; and a second set of metallic layers occupying said even-numbered positions.

23. The voltage variable capacitor as recited in claim 22, wherein a positive voltage difference causes a dimensional change in said plurality of voltage variable material layers, thereby causing said first set of metallic layers in said stack to move away from said second set of metallic layers, said voltage difference being positive when established from a metallic layer in said first set of metallic layers to a metallic layer in said second set of metallic layers.

24. The voltage variable capacitor as recited in claim 22, wherein a positive voltage difference causes a dimensional change in said plurality of voltage variable material layers, thereby causing said first set of metallic layers in said stack to move away from said second set of metallic layers, said voltage difference being positive when established at a polarity equal to an original poling voltage polarity.

25. An electronic circuit comprising:

at least one inductive element; and at least one voltage variable capacitor coupled to said at least one inductive element, wherein a voltage variable capacitor comprises:

a first plate;

a second plate dielectrically coupled to said first plate, wherein a first amount of displacement is established between said first plate and said second plate, said first amount of displacement establishing a first amount of capacitance between said first plate and said second plate;

a displacement device coupled to said first plate, said displacement device for changing said first amount of displacement, wherein said displacement device comprises:

a plurality of voltage variable material layers;

a plurality of metallic layers, wherein said plurality of metallic layers is alternated with said plurality of voltage variable material layers to form a stack such that a voltage variable layer is disposed between two corresponding ones of said plurality of metallic layers, said voltage variable layer having a voltage variable thickness which changes when a voltage difference is applied across said voltage variable layer, thereby changing a distance between said two corresponding ones of said plurality of metallic layers which causes said first amount of capacitance to change.

* * * * *

UNITED STATES PATENT AND TRADEMARK OFFICE
CERTIFICATE OF CORRECTION

PATENT NO. : 6,088,214
DATED : July 11, 2000
INVENTOR(S) : Hugh R. Malone, et al.

It is certified that error appears in the above-identified patent and that said Letters Patent is hereby corrected as shown below:

Claim 1, Column 9,
Line 64, after first occurrence "plate" insert --of said plurality of first plates--.
Line 65, after second occurrence "plate" insert --of said plurality of second plates--.

Claim 2, Column 10,
Line 11, after "layer" insert --of said plurality of voltage variable material layers--.

Claim 7, Column 10,
Line 38, after first occurrence "of" insert --said plurality of --.
Line 45, after "of" insert --said plurality of --.

Claim 8, Column 10,
Line 49, delete "of metallic layers".
Line 51-52, delete "of metallic layers".

Claim 9, Column 10,
Line 55, after "of" insert --said plurality of --.
Line 58, delete "of metallic layers".
Line 60, delete "of metallic layers".
Line 61, after "of" insert -said plurality of--.
Lines 64-65, delete "of metallic layers".

Claim 12, Column 11,
Line 15, delete "of metallic layers".
Line 16, delete "of metallic layers".
Line 18, delete "of metallic layers".
Line 19, delete "of metallic layers".

Claim 22, Column 12,
Line 22, after "layers" insert --of said plurality of--.
Line 23, after "layers" insert --of said plurality of --.

UNITED STATES PATENT AND TRADEMARK OFFICE
CERTIFICATE OF CORRECTION

PATENT NO. : 6,088,214
DATED : July 11, 2000
INVENTOR(S) : Hugh R. Malone, et al.

It is certified that error appears in the above-identified patent and that said Letters Patent is hereby corrected as shown below:

<u>Claim 23, Column 21,</u>
Line 34, delete "of metallic layers".
Line 35, delete "of metallic layers".
Line 37, delete "of metallic layers".
Line 38, delete "of metallic layers".

<u>Claim 24, Column 12,</u>
Line 42, delete "of metallic layers".
Line 43, delete "of metallic layers".

Signed and Sealed this

Nineteenth Day of June, 2001

*Nicholas P. Godici*

*Attest:*

*Attesting Officer*

NICHOLAS P. GODICI
*Acting Director of the United States Patent and Trademark Office*